(12) United States Patent
Lin et al.

(10) Patent No.: US 11,561,410 B2
(45) Date of Patent: Jan. 24, 2023

(54) DRIVING MECHANISM FOR OPTICAL ELEMENT

(71) Applicant: TDK TAIWAN CORP., Taoyuan (TW)

(72) Inventors: Sin-Hong Lin, Taoyuan (TW);
Kun-Shih Lin, Taoyuan (TW);
Yu-Cheng Lin, Taoyuan (TW);
Wen-Yen Huang, Taoyuan (TW);
Shih-Wei Hung, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 309 days.

(21) Appl. No.: 16/900,246

(22) Filed: Jun. 12, 2020

(65) Prior Publication Data
US 2021/0063677 A1 Mar. 4, 2021

Related U.S. Application Data

(60) Provisional application No. 62/894,295, filed on Aug. 30, 2019.

(51) Int. Cl.
*G02B 7/04* (2021.01)
*G02B 27/64* (2006.01)
(Continued)

(52) U.S. Cl.
CPC ............ *G02B 27/646* (2013.01); *G01B 11/24* (2013.01); *G01S 7/4813* (2013.01); *G01S 7/4816* (2013.01); *G01S 7/4817* (2013.01); *G01S 17/42* (2013.01); *G02B 7/005* (2013.01); *G02B 7/04* (2013.01); *G02B 7/1821* (2013.01); *G02B 26/0816* (2013.01); *G02B 26/101* (2013.01); *G02B 26/105* (2013.01); *G03B 5/00* (2013.01); *G03B 5/06* (2013.01); *H02K 41/0356* (2013.01); *G02B 7/1805* (2013.01); *G03B 3/10* (2013.01); *G03B 5/04* (2013.01); *G03B 13/36* (2013.01);
(Continued)

(58) Field of Classification Search
CPC . G02B 7/09; G02B 7/005; G02B 7/04; G02B 7/10; G02B 27/64; G02B 27/646; G02B 13/001; G02B 7/023; G02B 7/08; G03B 5/00; G03B 13/34; G03B 13/36; G03B 13/32; G03B 2205/0069; G03B 2205/0015; G03B 2205/0007; G03B 2205/0046; G03B 19/22; G03B 3/10; G03B 17/02; H04N 5/2328; H04N 5/2253; H04N 5/2254; H05K 1/18; H02K 41/0354; H02K 41/0356
USPC ........... 359/822, 823, 824, 694, 813; 396/89
See application file for complete search history.

(56) References Cited

U.S. PATENT DOCUMENTS

2018/0136435 A1* 5/2018 Kuo .................... G02B 7/08
2018/0338069 A1* 11/2018 Hu ..................... H04N 5/2252

FOREIGN PATENT DOCUMENTS

| CN | 110632731 A | 12/2019 |
|---|---|---|
| CN | 112083544 A | 12/2020 |

* cited by examiner

*Primary Examiner* — Marin Pichler
(74) *Attorney, Agent, or Firm* — Muncy, Geissler, Olds & Lowe, P.C.

(57) ABSTRACT

A driving mechanism for an optical element is provided, including a fixed part, a movable part and a driving assembly. The movable part is configured to connect to the optical element having the optical axis. The movable part is movable relative to the fixed part. The driving assembly is configured to drive the movable part to move relative to the fixed part.

10 Claims, 9 Drawing Sheets

(51) Int. Cl.
   *G03B 13/36*      (2021.01)
   *H02K 5/24*       (2006.01)
   *H02K 11/01*      (2016.01)
   *H02K 41/035*     (2006.01)
   *G03B 5/06*       (2021.01)
   *G03B 5/00*       (2021.01)
   *G02B 7/182*      (2021.01)
   *G02B 7/00*       (2021.01)
   *G01B 11/24*      (2006.01)
   *G01S 7/481*      (2006.01)
   *G01S 17/42*      (2006.01)
   *G02B 26/08*      (2006.01)
   *G02B 26/10*      (2006.01)
   *G03B 3/10*       (2021.01)
   *G02B 7/18*       (2021.01)
   *G03B 17/17*      (2021.01)
   *G03B 5/04*       (2021.01)
   *H04N 5/225*      (2006.01)

(52) U.S. Cl.
   CPC ...... *G03B 17/17* (2013.01); *G03B 2205/0007* (2013.01); *G03B 2205/0046* (2013.01); *G03B 2205/0069* (2013.01); *H02K 5/24* (2013.01); *H02K 11/01* (2016.01); *H02K 2201/18* (2013.01); *H04N 5/2253* (2013.01)

DRIVING MECHANISM FOR OPTICAL ELEMENT

CROSS REFERENCE TO RELATED APPLICATIONS

This application claims the benefit of U.S. Provisional Application No. 62/894,295, filed on Aug. 30, 2019, the entirety of which is incorporated by reference herein.

BACKGROUND OF THE INVENTION

Field of the Invention

The application relates in general to a driving mechanism for an optical element, and in particular to a driving mechanism for an optical element that includes an elastic assembly and a driving assembly.

Description of the Related Art

Thanks to ongoing technological developments, recent electronic devices (such as tablet computers and smartphones) usually include a lens module capable of aiding in photography or recording video, and some are even equipped with dual lens modules, bringing users a wealth of visual enjoyment. However, an image may come out blurry if the user shakes the lens module in the electronic device when using it. To improve image quality, it is increasingly important to design an effectively shockproof lens module. In addition, designers are currently pursuing the miniaturization of such devices, and it is expected that electronic products will be smaller and lighter with each successive generation. Therefore, how to design an optical mechanism with a better optical compensation function with a smaller volume through a special configuration is an important issue.

BRIEF SUMMARY OF INVENTION

To address the deficiencies of conventional products, an embodiment of the invention provides a driving mechanism for an optical element, including a fixed part, a movable part and a driving assembly. The movable part is configured to connect to an optical element having an optical axis. The movable part is movable relative to the fixed part. The driving assembly is configured to drive the movable part to move relative to the fixed part.

In some embodiments, the driving assembly includes a magnetic isolation element, a driving coil, and a driving magnetic element. The driving coil is disposed on the movable part, and the magnetic isolation element and the driving magnetic element are disposed on the fixed part. The magnetic isolation element is affixed to the fixed part, and when viewed in a direction that is perpendicular to the optical axis, the magnetic isolation element and the driving magnetic element at least partially overlap. When viewed along the optical axis, the magnetic isolation element and the driving magnetic element at least partially overlap. The fixed part includes a housing, and the magnetic isolation element is disposed between the housing and the driving magnetic element.

In some embodiments, the movable part includes an elastic element, the elastic element has a first elastic element, and the driving magnetic element is at least partially located between the magnetic isolation element and the first elastic element. When viewed along the optical axis, one corner of the first elastic element is exposed to the magnetic isolation element. The corner of the first elastic element exposed by the magnetic isolation element is connected to the housing.

In some embodiments, the housing has a concave portion corresponding to the exposed corner of the first elastic element. The concave portion is recessed toward the first elastic element. The fixed part includes a protruding column portion, and the first elastic element is connected to the protruding column portion. When viewed in a direction that is perpendicular to the optical axis, the concave portion at least partially overlaps the magnetic isolation element. When viewed along the optical axis, the concave portion at least partially overlaps the first elastic element and the protruding column portion.

In some embodiments, the fixed part further includes a base, and the housing corresponds to the base. The first elastic element is connected to the base. The base has a protruding column portion, and the first elastic element is connected to the protruding column portion. The elastic assembly further includes a second elastic element, and the movable part is between the first elastic element and the second elastic element. The second elastic element is used for electrical conduction. The base further has a circuit member, and the second elastic element is electrically connected to the circuit member.

In some embodiments, the magnetic isolation element has an inner notch, and a limit portion of the movable part is exposed to the inner notch. The magnetic isolation element further has a dodge portion, wherein along the optical axis, the first elastic element is exposed to the dodge portion, and when viewed along the optical axis, the first elastic element protrudes from the dodge portion. When viewed in a direction that is perpendicular to the optical axis, the magnetic isolation element completely covers the driving magnetic element. When viewed along the optical axis, the shortest distance between the inner notch and the optical axis is less than the shortest distance between the dodge portion and the optical axis. When the movable part moves to a limit position, the limit part contacts the housing.

In some embodiments, the driving mechanism further comprises a winding post arranged in the movable part for a lead wire of the driving coil to wind. When viewed from a light incident direction of the driving mechanism for an optical element, the winding post is at least partially shielded by the movable part. When viewed from the light incident direction, the winding post is completely shielded by the movable part.

In some embodiments, when viewed along a direction that is perpendicular to the optical axis, the magnetic isolation element has a C-shaped structure. The magnetic isolation element includes an upper partition and two side partitions, and the two side partitions are connected by the upper partition. When viewed in a direction that is perpendicular to the optical axis, the two side partitions are located between the housing and the driving magnetic element. In the direction of the optical axis, the upper partition is located between the driving magnetic element and the housing. The maximum width of each side partition along the optical axis is greater than the maximum width of the driving magnetic element along the optical axis. When viewed in a direction that is perpendicular to the optical axis, the two side partitions at least partially overlap the driving coil. When viewed in a direction that is perpendicular to the optical axis, the two side partitions expose at least a portion of the driving coil.

In some embodiments, the driving mechanism further comprises a shock-absorbing element arranged between the movable part and the fixed part. The fixed part has a protruding column portion, and the shock-absorbing element is arranged between the protruding column portion and the movable part. The protruding column portion has an extension structure toward the movable part, and the shock-absorbing element is connected to the extension structure. In the direction of the optical axis, the maximum length of the protruding column portion is greater than the maximum length of the extension structure. The extension structure has an inclined surface, which is a surface that is inclined with respect to the optical axis.

In some embodiments, the driving mechanism further comprises a limit structure for limiting the movement of the movable part along a direction that is perpendicular to the optical axis. The limit structure is located between the columns of the protruding column portion of the fixed part. The movable part has a groove, located at the side of the movable part that is not parallel to the side of the movable part where the driving magnetic element is disposed. The limit structure is accommodated in the groove. When viewed along the optical axis, the thickness of the limit structure in a direction perpendicular to the optical axis is greater than the thickness of the groove in a direction perpendicular to the optical axis.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical systems are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
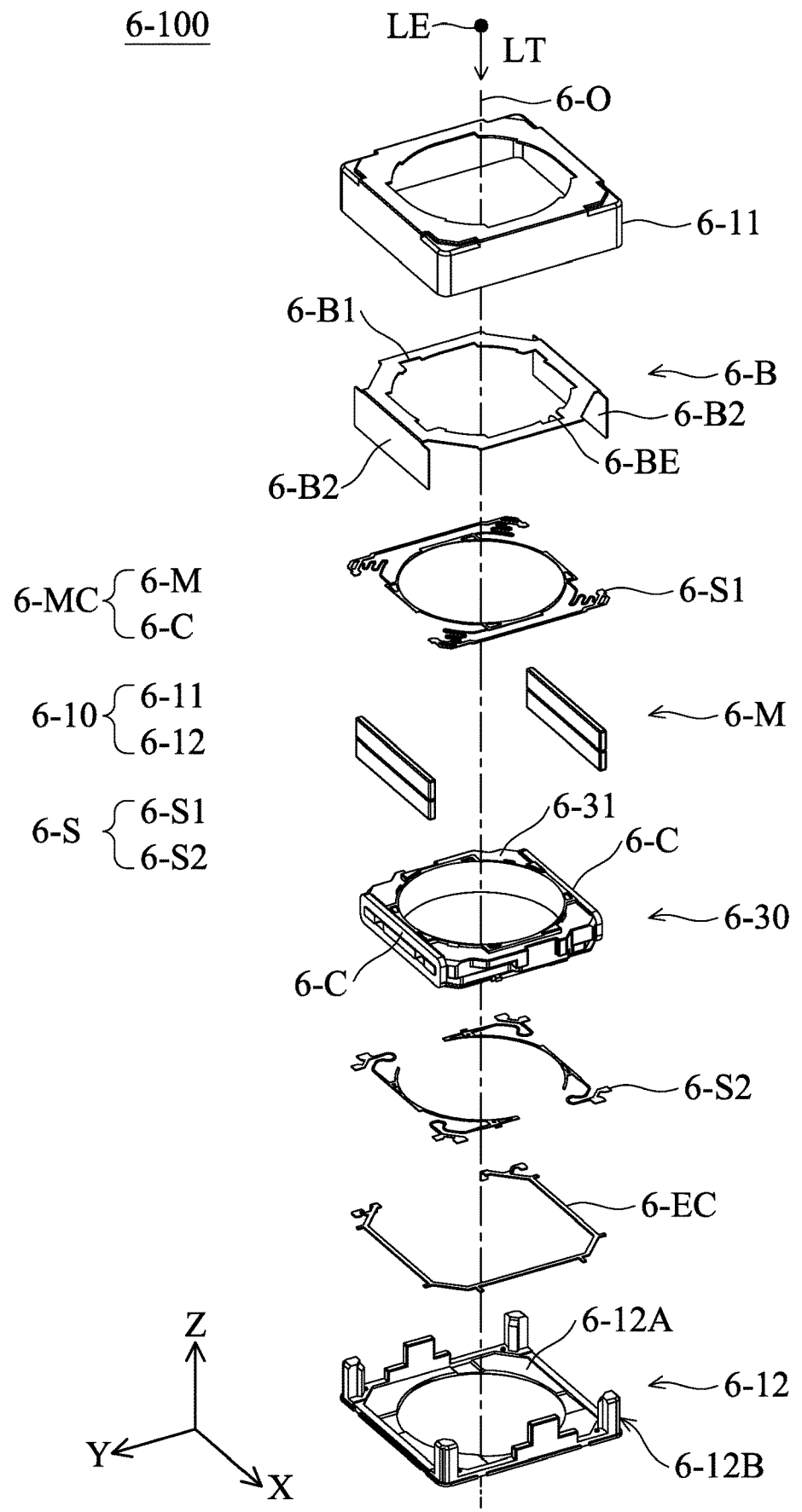
FIG. 1 is a schematic diagram of a driving mechanism for an optical element according to an embodiment of the present invention.

Referring to FIGS. 1 and 2, FIG. 1 is a schematic view showing the driving mechanism for an optical element 6-100, and FIG. 2 is an exploded view of the driving mechanism 6-100. The driving mechanism for an optical element 6-100 can be used, for example, to drive and sustain an optical element (such as a lens or a lens assembly having a plurality of lenses), and can be disposed inside an electronic device (such as a camera, a tablet or a mobile phone). When light (incident light) from the outside (at the light incident end 6-LE) enters the driving mechanism for an optical element 6-100 along a light incident direction 6-LT, the light can pass through an optical element (e.g. disposed on the movable part 6-30) to an image sensor module (e.g. disposed on the fixed part 6-10) to obtain an image. Through the driving mechanism 6-100, the optical element and the image sensor can relatively move, thereby achieving optical zooming, auto-focus (AF) or optical image stabilization (OIS). The detailed structure of the aforementioned driving mechanism for an optical element 6-100 will be described below.

Figure 2A:
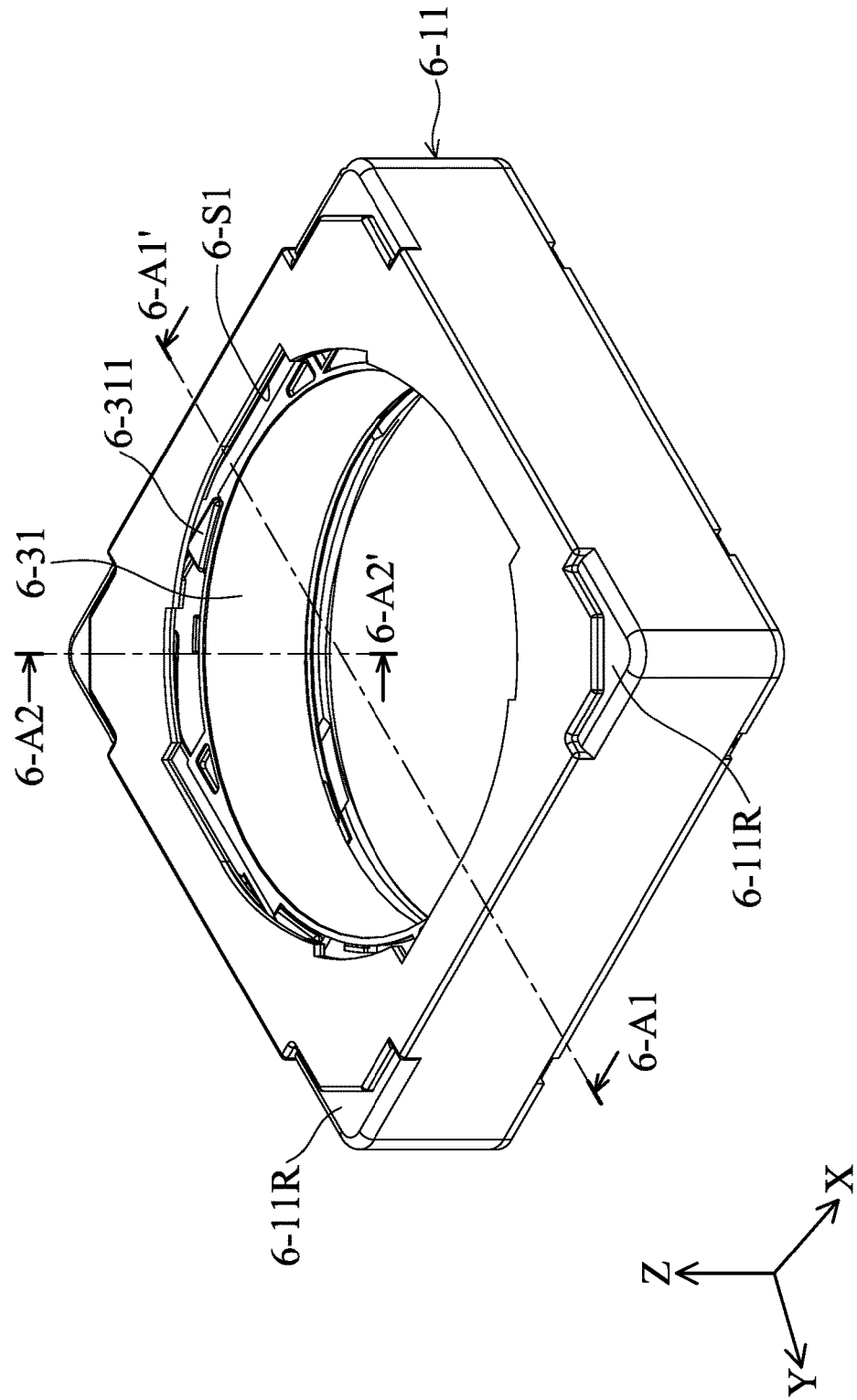
FIG. 2A is a schematic diagram of the driving mechanism in FIG. 1 after assembly.
Figure 2B:
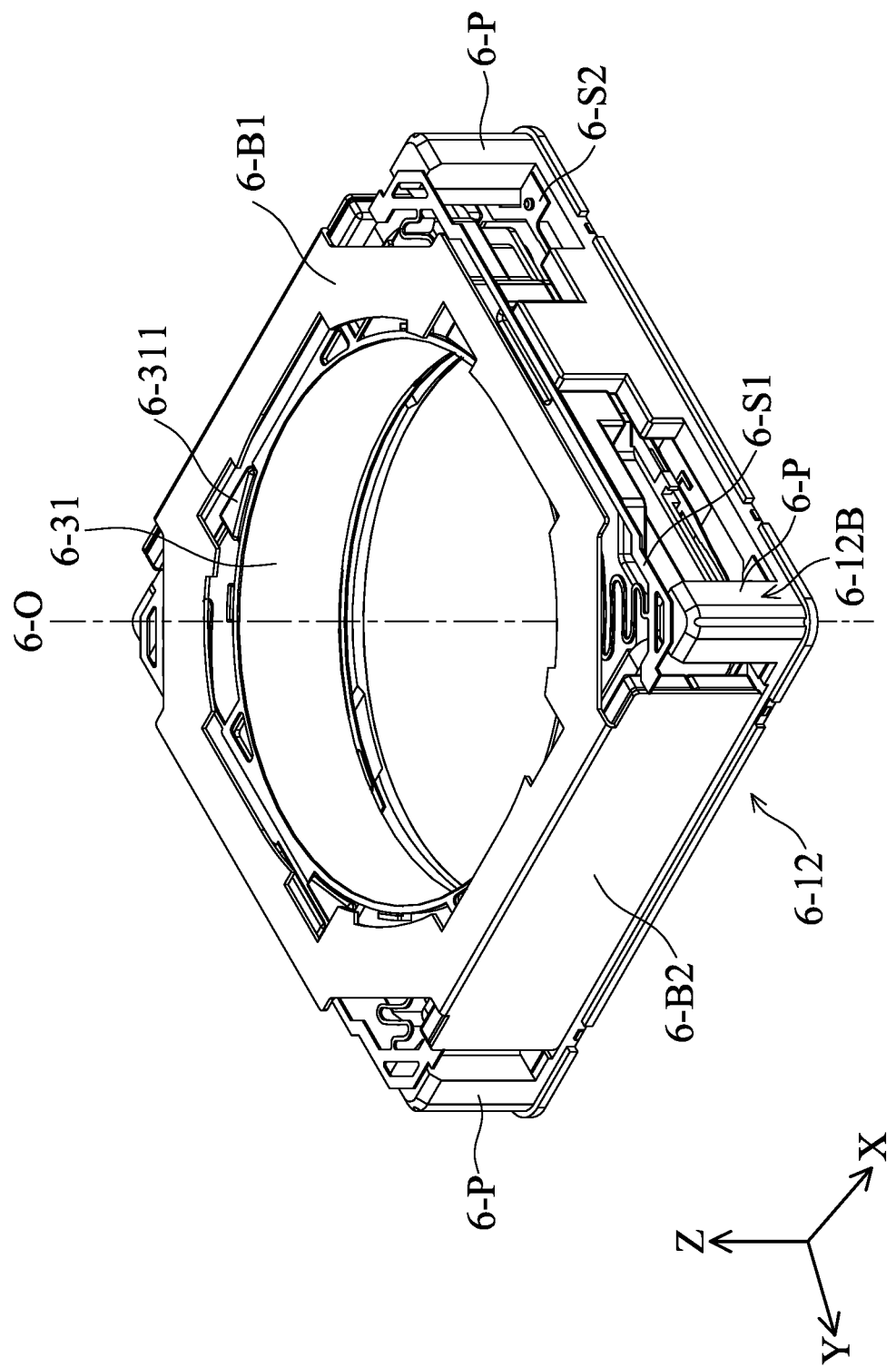
FIG. 2B is a schematic diagram of the driving mechanism in FIG. 2A which the housing is omitted.

Referring to FIGS. 1 and 2B, wherein FIG. 2B is a schematic diagram of the driving mechanism 6-100 omitting the housing 6-11. The driving mechanism 6-100 comprises a fixed part 6-10, a movable part 6-30 and a driving assembly 6-MC. The fixed part 6-10 includes a housing 6-11 and a base 6-12 which are corresponding to each other, and they form an accommodating space for the movable part 6-30 and the driving assembly 6-MC to be disposed therein, and provide protection. The movable part 6-30 is disposed on the base 6-12, and includes a holder 6-31 which is configured to sustain the optical element. The drive assembly 6-MC is disposed on the movable part 6-30 and the fixed part 6-10, and is configured to drive the movable part 6-30 and the optical element to move relative to the fixed part 6-10, thereby adjusting the posture or position of the movable part 6-30 with the optical element, so that the purposes of optical zooming, auto-focus, or optical image stabilization can be achieved.

Regarding the driving assembly 6-MC, it may be an electromagnetic driving assembly, including a magnetic isolation element (or magnetic partition) 6-B, a driving coil 6-C and a driving magnetic element 6-M.

Figure 3:
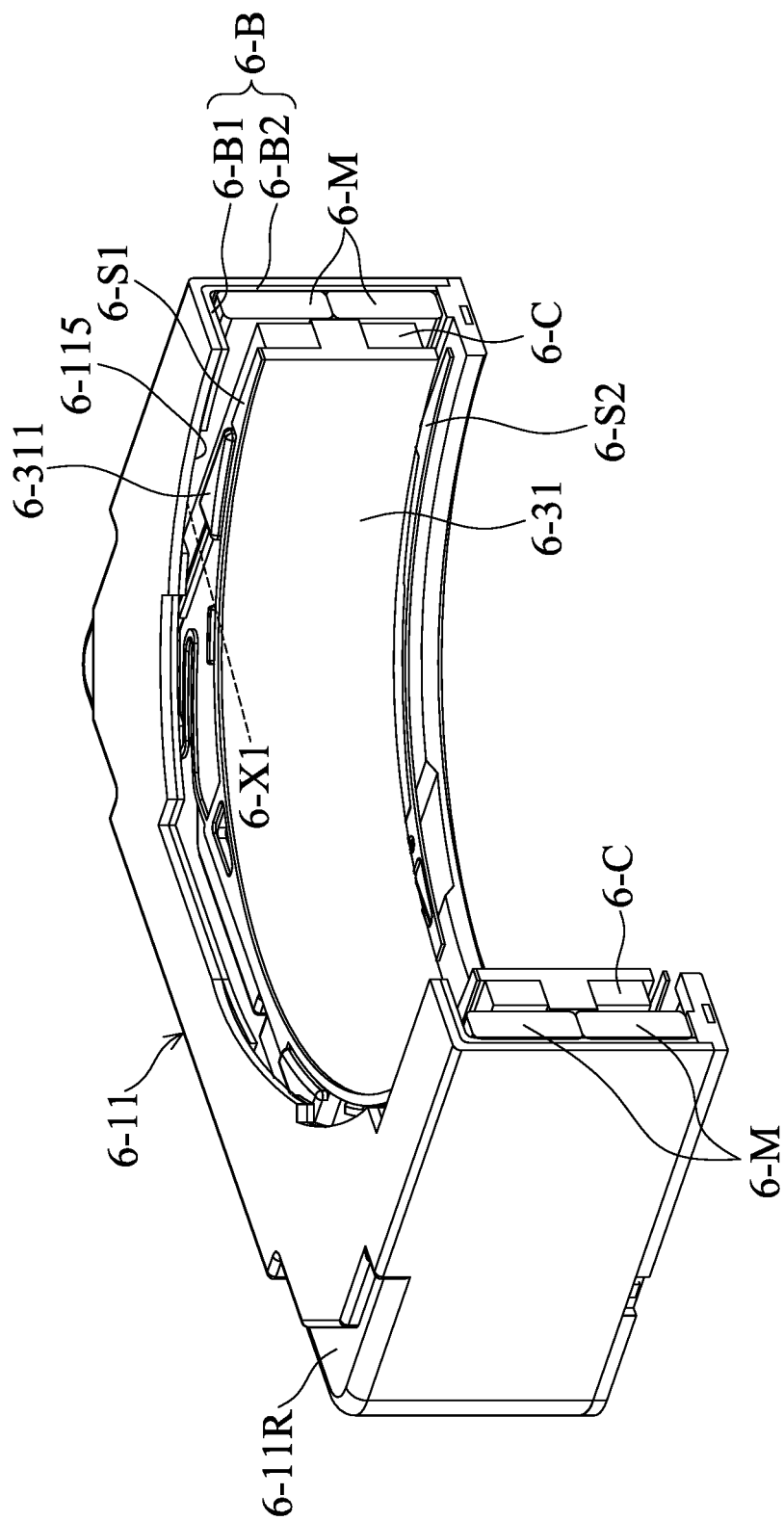
FIG. 3 is a perspective sectional view taken along line 6-A1-6-A1' in FIG. 2A.
Figure 4:
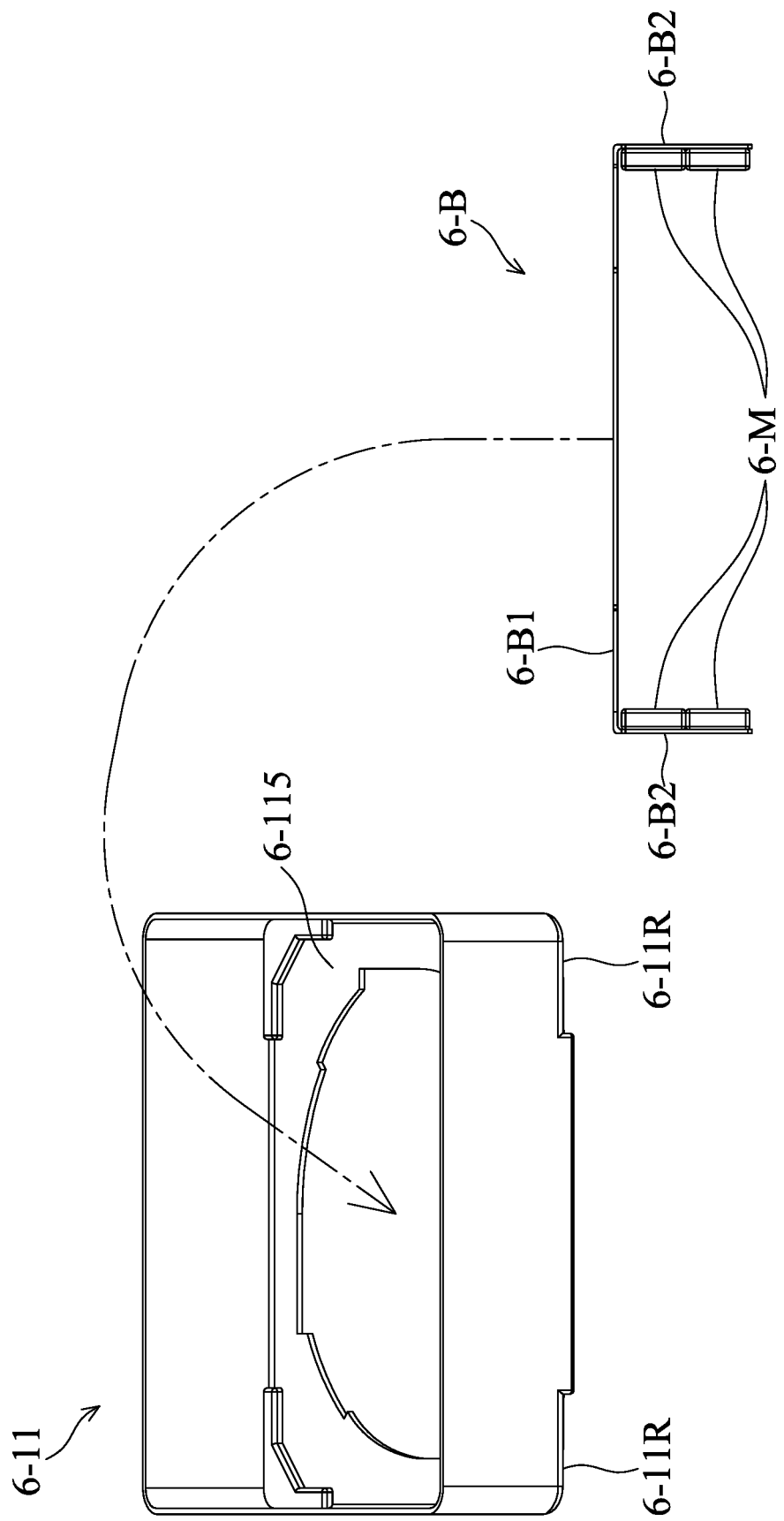
FIG. 4 is a schematic diagram of the housing and the magnetic isolation element presenting a C-shaped structure, and the driving magnetic element 6-M disposed thereon.

Referring to FIGS. 3-4, the magnetic isolation element 6-B is disposed on the inner surface 6-115 of the housing 6-11. In some embodiments, the magnetic isolation element 6-B is affixed to the inner surface 6-115. The driving coil 6-C and the driving magnetic element 6-M are respectively disposed on the movable part 6-30 and the magnetic isolation element 6-11. There is a gap between the driving magnetic element 6-M and the driving coil 6-C which correspond to each other.

When a driving signal is applied to the drive assembly 6-MC (for example, an external power supply applies current to the drive coil 6-C), a magnetic force is generated between the drive magnetic element 6-M and the drive coil 6-C, so that the movable part 6-30 can be driven to move relative to the fixed part 6-10. In this way, when the driving assembly 6-MC receives a driving signal, the driving assembly 6-MC drives the movable part 6-30 with the optical element to move along the optical axis 6-O of the optical element, or move in a plane that is perpendicular to the optical axis 6-O, so as to achieve optical image stabilization, autofocus or the effect of changing the focal length. In some embodiments, the optical axis 6-O also can be regarded as the optical axis of the driving mechanism 6-100.

It is worth noting that the aforementioned magnetic isolation element 6-B can also be used as a permeability element, located between the housing 6-11 and the driving magnetic element 6-M. By the magnetic isolation element 6-B, the magnetic force (between the driving magnetic element 6-M and the driving coil 6-C) can be enhanced in a predetermined direction, to enhance the magnetic thrust generated by the driving assembly 6-MC to move the movable part 6-30, and the magnetic interference can be reduced. Moreover, the overall mechanical strength of the fixed part 6-10 can be enhanced. In this way, compared with the traditional voice coil motor (VCM) device having a frame with a certain space provided for carrying magnets, since there is no longer a frame, this embodiment can greatly reduce the space occupied by the components, which is conducive to miniaturization. In addition, the aforementioned extension structure 6-PS also has an inclined surface 6-PS1 inclined with respect to the optical axis 6-O, or inclined with respect to the bottom surface of the base 12 or the top surface of the housing 11.

Referring to FIG. 3, regarding the position of the magnetic isolation element 6-B, when viewed along the optical axis 6-O direction, the magnetic isolation element 6-B at least partially overlaps the driving magnetic element 6-M. When viewed along a direction that is perpendicular to the optical axis 6-O, the magnetic isolation element 6-B is disposed between the housing 6-11 and the drive magnetic element 6-M.

Figure 2C:
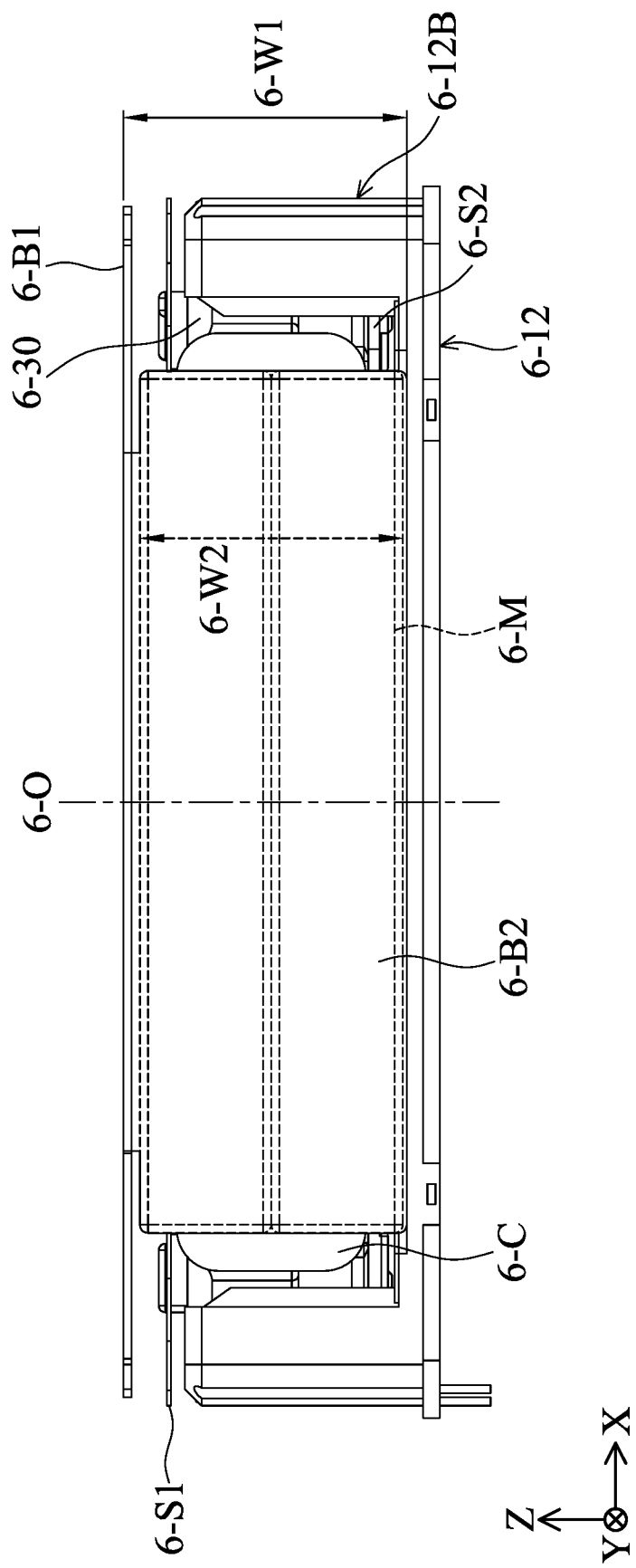
FIG. 2C is a side view of the driving mechanism in FIG. 2B.

Referring to FIG. 4, regarding the details of the magnetic isolation element 6-B, viewed along the direction perpendicular to the optical axis 6-O, the magnetic isolation element 6-B presents a C-shaped structure, and the magnetic isolation element 6-B includes an upper partition 6-B1 and the two side partitions 6-B2 are connected via the upper partition 6-B1. In the optical axis 6-O direction, the upper partition 6-B1 is located between the driving magnetic element 6-M and the housing 6-11. The two side plates 6-B2 extend in the optical axis direction 6-O, and in this direction, such as the Z axis, the maximum width 6-W1 of the side partitions 6-B2 is larger than the maximum width 6-W2 of the driving magnetic element 6-M. As shown in FIG. 2C, viewed along the direction of the perpendicular optical axis 6-O (the Y-axis), the two side partitions 6-B2 of the magnetic isolation element 6-B completely cover the driving magnetic element 6-M, and the two side partitions 6-B2 at least partially overlap the driving coil 6-C. Also viewed along the direction perpendicular to the optical axis 6-O, the two side partitions 6-B2 expose at least a portion of the driving coil 6-C.

In some embodiments, in some embodiments, the holder 6-31 of the movable part 6-30 may be provided with a position sensing element, which may be a position sensor, for example, may be a magnetoresistive sensor (MRS) or optical sensor. The position sensing element is used to sense the relative positional relationship between the movable part 6-30 and the fixed part 6-10, so that a control unit (not shown) can adjust the position between the two through the driving component 6-MC. In some embodiments, the aforementioned position sensing element belongs to an element of the driving assembly 6-MC.

Referring to FIGS. 1 and 2B, the movable part 6-30 of the driving mechanism 6-100 in this embodiment further includes an elastic assembly 6-S, which connects the movable part 6-30 and the housing 6-11. The elastic assembly 6-S has a first elastic element 6-S1 and a second elastic element 6-S2, which can be used as a flexible leaf spring assembly. In some embodiments, the elastic elements 6-S1, 6-S2 are made of metal. The first and second elastic elements 6-S1, 6-S2 are respectively disposed on the upper and lower sides of the holder 6-31, or the holder 6-31 is sandwiched between the two. The elastic assembly 6-S movably connects the holder 6-31 and the fixed part 6-10 so that the holder 6-31 can move relative to the housing 6-11 and the base 6-12. In addition, before the driving signal is applied, the aforementioned elastic assembly 6-S allows the holder 6-31 to maintain an initial position relative to the fixed part 6-10. In some embodiments, the aforementioned elastic assembly 6-S may be regarded as a part of the movable part 6-30, which connects the holder 6-31 and the fixed part 6-10.

For details of the elastic assembly 6-S, the lower second elastic element 6-S2 is placed on the base 6-12, and can be positioned by a or a plurality of positioning posts of the base 6-12 to connect the holder 6-31 and base 6-12. In addition, a base body 6-12A of the base 6-12 is provided with a circuit member 6-EC, and the second elastic element 6-S2 is electrically connected to the circuit member 6-EC, so that the second elastic element 6-S2 is used for electrical conduction, being electrically connected to the driving coil 6-C.

Figure 5:
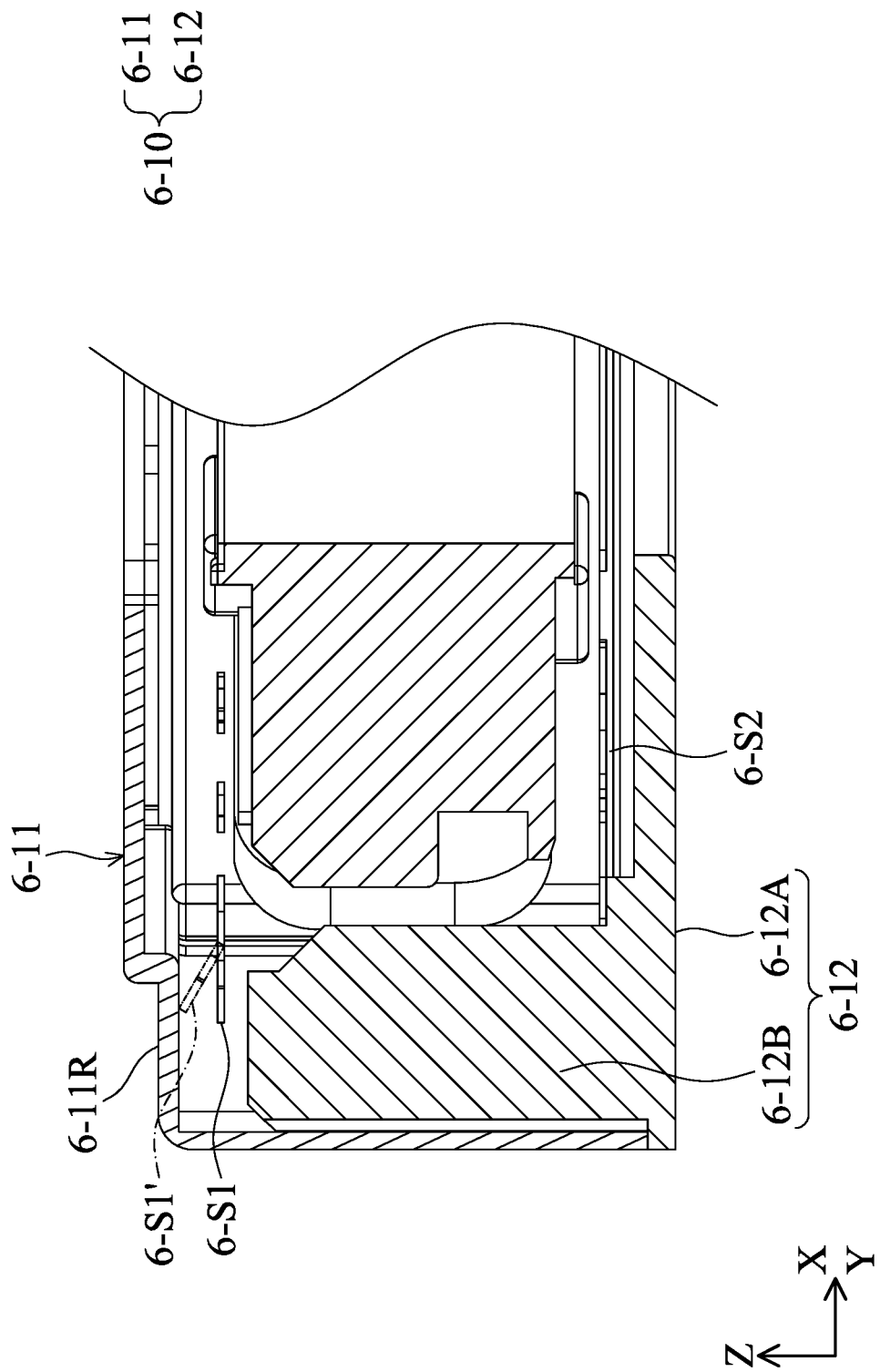
FIG. 5 is a partial sectional view taken along line 6-A2-6-A2' in FIG. 2A.

For the first elastic element 6-S1 on the upper side, please refer to FIGS. 2A, 2B, and 5 together, wherein FIG. 5 is a cross section diagram along line 6-A2-6-A2' in FIG. 2A. The first elastic element 6-S1 is located on the upper side of the holder 6-31 and connects the holder 6-31 and the housing 6-11. The housing 6-11 has a concave portion 6-11R recessed toward the first elastic element 6-S1, so that when the driving mechanism 6-100 is assembled, since the concave portion 6-11R is closer to the first elastic element 6-S1 than the topmost surface of the housing 6-11, this allows the first elastic element 6-S1 to be more easily assembled with the housing 6-11, for example, by applying adhesive, which can improve the convenience of assembly. It should be noted that when the first elastic element 6-S1 is to be bonded or joined to the concave portion 6-11R, the first elastic element 6-S1 can be bent to connect the housing 6-11, such as the bent first elastic element 6-S1' in FIG. 5. In this embodiment, viewed in a direction perpendicular to the optical axis 6-O, the concave portion 6-11R at least partially overlaps the magnetic isolation element 6-B; and the driving magnetic element 6-M is at least partially (such as the upper part of the driving magnetic element 6-M) located between the magnetic isolation element 6-B and the first elastic element 6-S1.

In other embodiments, the first elastic element 6-S1 may be affixed to the base 6-12 of the fixed part 6-10. For details, please refer to FIGS. 1 and 2B. The base 6-12 includes a base body 6-12A and a protruding column portion 6-12B. The protruding column portion 6-12B is extending towards the housing 6-11, and is connected to the base body 6-12A and disposed around or at the corners of the base body 6-12A, In this embodiment, the protruding column portion 6-12B includes a plurality of (four) columns 6-P, whose long axis direction is parallel (including or substantially parallel, such as +5 or −5 degrees) to the optical axis 6-O. The ends or corners of the first elastic element 6-S1 are connected to the columns 6-P of the protruding column portion 6-12B. In this way, it is also possible to save installations such as a traditional rack frame for elastic elements, to facilitate miniaturization of the device.

Figure 6:
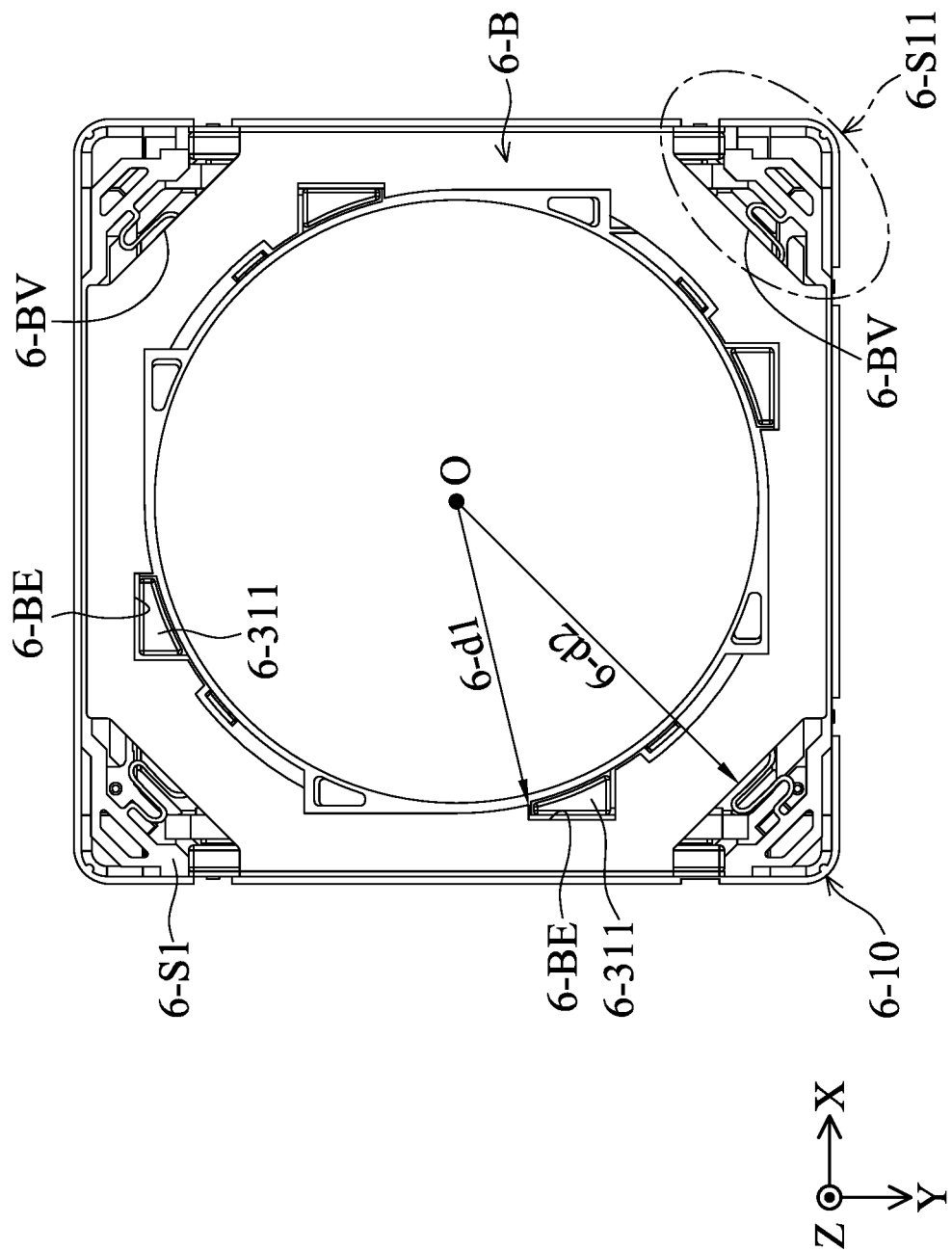
FIG. 6 is a top plan view of the driving mechanism in FIG. 2A (the housing being omitted).

FIG. 6 shows a schematic top plan view of the assembled driving mechanism 6-100 (omitted the housing 6-11 to show the internal structure) in FIG. 2A. Viewed along the optical axis 6-O direction, each corner 6-S11 of the first elastic element 6-S1 is exposed by the magnetic isolation element 6-B, or the magnetic isolation element 6-B exposes the corners 6-S11 of the first elastic element 6-S1. The exposed corner 6-S11 of the first elastic element 6-S1 is connected to the housing 6-11. As shown in FIG. 5, the concave portion 6-11R of the housing 6-11 corresponding to the exposed corners 6-S11 of the first elastic element 6-11. Viewed in the optical axis 6-O direction, the concave portion 6-11R, the first elastic element 6-S1 and the protruding column portion 6-12B at least partially overlap.

Continuing to refer to FIG. 6, the aforementioned magnetic isolation element 6-B further has an inner notch 6-BE, and a limit portion 6-311 of the holder 6-31 of the movable part 6-30 is exposed to the inner notch 6 BE. When the movable part 6-30 is driven by the driving assembly 6-MC to move to a limit position 6-X1 (refer to FIG. 3) relative to the fixed part 6-10, the aforementioned limit portion 6-311 passes through the first elastic element 6-S1, and then passes through the inner notch 6-BE through the magnetic isolation element 6-B and contacts the housing 6-11 to be limited. In this way, through the inner notch 6-BE, the limit portion 6-311 of the movable part 6-30 can pass through the magnetic isolation element 6-B and be directly in contact with the housing 6-11, so that the moving stroke of the movable part 6-30 can be increased, and the focusing, zooming, or automatic compensation ability of the driving mechanism 6-100 can be improved.

As can be seen from the top view of FIG. 6, the magnetic isolation element 6-B has a dodge portion 6-BV. It can be considered that the magnetic isolation element 6-B, which was originally substantially quadrangular, has a missing corner at each of its original corner areas, and this is the dodge portion 6-BV. In the optical axis 6-O direction, the first elastic element 6-S1 is exposed to the dodge portion 6-BV. Viewed in the direction of the optical axis 6-O, the first elastic element 6-S1 protrudes from the dodge portion 6-BV of the magnetic isolation element 6-B, and the shortest distance 6-$d1$ between the aforementioned inner notch 6-BE and the optical axis 6-O is smaller than the shortest distance 6-$d2$ between the dodge portion 6-BV and the optical axis 6-O.

Figure 7:
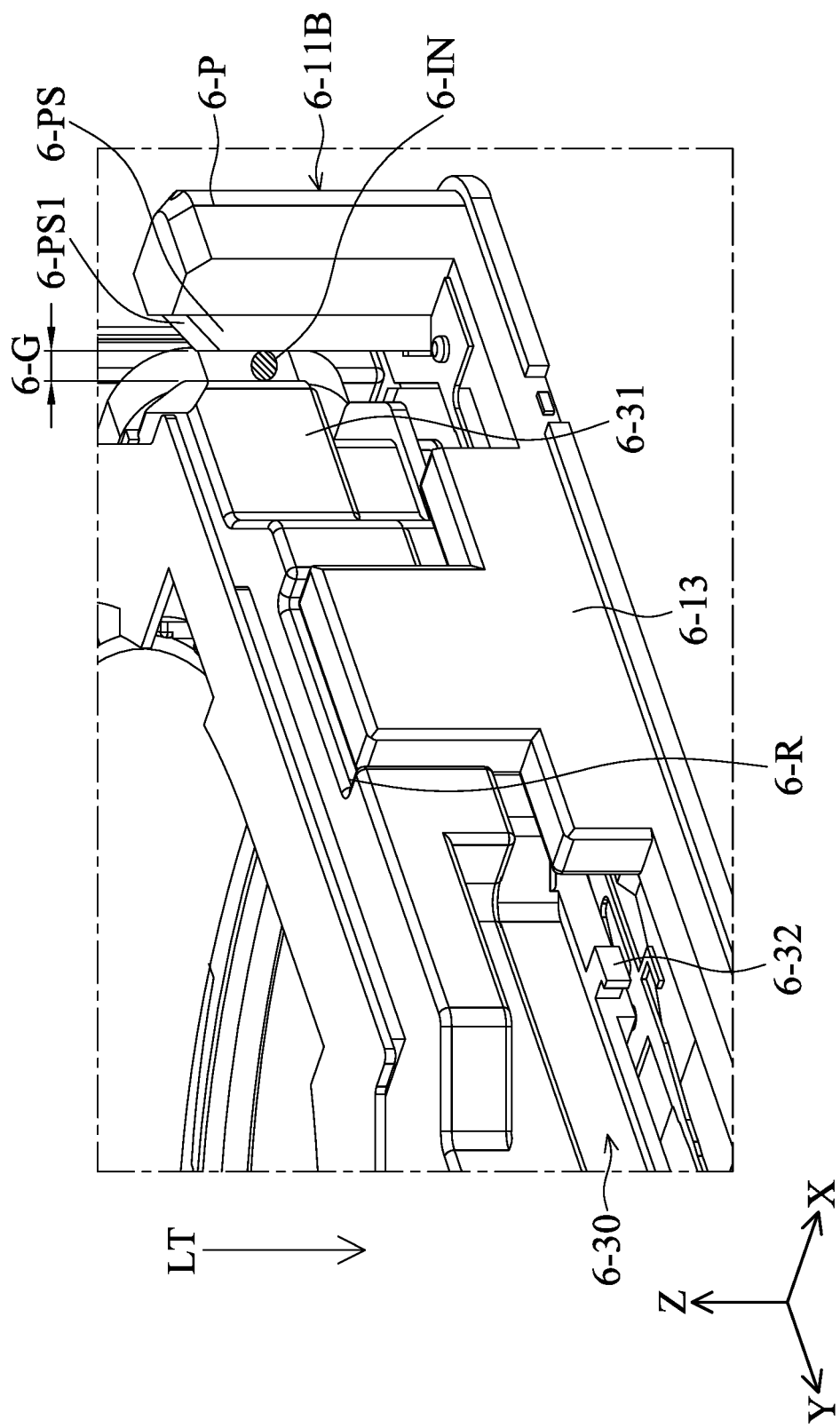
FIG. 7 is a partial schematic diagram of a plurality of the driving mechanism, wherein the housing and the first elastic element are omitted.

Referring to FIG. 7, which is a schematic diagram showing a partial driving mechanism 6-100, and to clearly see the internal structure, the housing 6-11 and the first elastic element 6-S1 are omitted. The driving mechanism 6-100 further includes a winding post 6-32, which is disposed on the movable part 6-30 for the lead wire of the driving coil 6-C to wind. Specifically, the winding post 6-32 is disposed on the holder 6-31, and extends or protrudes in a direction perpendicular to the optical axis 6-O. Viewed from the light incident direction 6-LT of the driving mechanism 6-100, the winding post 6-32 is shielded by the magnetic isolation element 6-B (as shown in FIG. 6, the post 6-32 cannot be seen). In addition, when viewed from the light incident direction 6-LT, the winding post 6-32 is also at least partially shielded by the movable part 6-30, and in this embodiment, the winding post 6-32 is completely covered by the movable part 6-30. In some embodiments, the winding post 6-32 is a part of the movable part 6-30, viewed from the incident direction 6-LT, which is completely shielded by the holder 6-31.

In some embodiments, the driving mechanism 6-100 further includes a shock-absorbing element 6-IN, disposed between the movable part 6-30 and the fixed part 3-10. In detail, the shock-absorbing element 6-IN is disposed between the protruding column portion 6-12B and the movable part 6-30, wherein the column 6-P of the protruding column portion 6-12B has an extension structure 6-PS extending toward (horizontal direction) the movable part 6-30, and the shock-absorbing element 6-IN connects the extension structure 6-PS with the holder 6-31. The shock-absorbing element 6-IN is disposed in the gap 6-G between the extension structure 6-PS and the holder 6-31. In the optical axis 6-O direction, the maximum length of the protruding column portion 6-12B is greater than the maximum length of the extension structure 6-PS. In addition, the aforementioned extension structure 6-PS also has an inclined surface 6-PS1 inclined with respect to the optical axis 6-O, or inclined with respect to the bottom surface of the base 12 or the top surface of the housing 11.

Continuing to refer to FIG. 7, the driving mechanism 6-100 further includes a limit structure 6-13, and the movable part 6-30 has a groove 6-R which is located at the side of the movable part that is not parallel to the side where the driving magnetic element 6-M is placed. The limiting structure 6-13 and the groove 6-R are matched with each other, thereby limiting the movement of the movable part 6-30 along the direction perpendicular to the optical axis O. In this embodiment, the limit structure 6-13 is located between the plurality of columns 6-P of the protruding column portion 6-12B of the fixed part 6-10, and the limit structure 6-13 is accommodated in the groove 6-R. Viewed along the optical axis 6-O direction, the thickness of the limit structure 6-13 in a direction perpendicular to the optical axis 6-O (such as the X-axis) is greater than the thickness of the groove 6-R in a direction perpendicular to the optical axis 6-O. It can further ensure that the movement of the movable part 6-30 is restricted and the stability of the device is improved. It should be noted that, in this embodiment, there are two limit structures 6-13 located on both sides of the movable part 6-30 (different from the side where the driving magnetic element 6-M is placed), corresponding to the two grooves 6-R. In other embodiments, only one limiting structure 6-13 and the corresponding groove 6-R can effectively limit the movement of the movable part 6-30. In some embodiments, the limiting structure 6-13 belongs to the fixed part 6-10.

In summary, an embodiment of the present invention provides a driving mechanism for an optical element, including a fixed part, a movable part and a driving assembly. The movable part is configured to connect the optical element to the optical axis. The movable part is movable relative to the fixed part. The driving assembly is configured to drive the movable part to move relative to the fixed part. In some embodiments, the driving assembly includes a magnetic isolation element, a driving coil, and a driving magnetic element. The driving coil is arranged in the movable part, and the magnetic isolation element and the driving magnetic element are disposed on the fixed part. The magnetic isolation element is affixed to the fixed part, and viewed in a direction perpendicular to the optical axis, the magnetic isolation element and the driving magnetic element at least partially overlap. Viewed in the direction of the optical axis, the magnetic isolation element and the driving magnetic element at least partially overlap. The fixed part includes a housing, and the magnetic isolation element is disposed between the housing and the driving magnetic element.

The embodiment of the present invention has at least one of the following advantages or effects. By providing a driving assembly, the movable part can be driven to move relative to the fixed part, thereby achieving the functions of optical zoom, focusing and optical compensation. In addition, in some embodiments, the driving assembly includes a magnetic isolation element, which is disposed outside the magnetic element and can be used as a carrier plate for carrying the magnetic element. In this way, not only can the magnetic thrust of the magnetic element be concentrated in a predetermined direction to improve the movement of the movable part, the magnetic isolation element can also prevent or reduce magnetic interference, and, since the magnetic isolation element is used as the carrier plate of the magnetic element, compared with the conventional voice coil motor provided with a rack frame as a carrier for the magnetic element, the driving mechanism without the frame also relatively saves the space used by the element, which is beneficial to miniaturization. In some embodiments, the limit part of the movable part directly passes through the magnetic isolation element and directly contacts the housing of the fixed part, which can greatly increase the stroke distance and improve the optical performance, such as optical zoom, focusing and optical compensation, and more detailed and precise.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A driving mechanism for an optical element, comprising:
   a fixed part;
   a movable part, configured to connect to an optical element having an optical axis, and is movable relative to the fixed part, wherein the movable part comprises:
   a first elastic element;
   a second elastic element; and
   a holder, suspended by the first elastic element and the second elastic element;
   a driving assembly, configured to drive the movable part to move relative to the fixed part,
   wherein the driving assembly comprises a driving coil, a driving magnetic element, and a magnetic isolation element, the driving coil and the driving magnetic element are respectively disposed on the movable part and the magnetic isolation element and are separated from the fixed part with the magnetic isolation element; and
   a shock-absorbing element arranged between the movable part and the fixed part;
   wherein the fixed part has a protruding column portion, and the shock-absorbing element is arranged between the protruding column portion and the movable part;
   wherein the protruding column portion has an extension structure which extends toward the movable part, and the shock-absorbing element is connected to the extension structure;
   wherein in the direction of the optical axis, the maximum length of the protruding column portion is greater than the maximum length of the extension structure.

2. The driving mechanism for an optical element as claimed in claim 1, wherein
   the magnetic isolation element is affixed to the fixed part, and when viewed in a direction that is perpendicular to the optical axis, the magnetic isolation element and the driving magnetic element at least partially overlap;
   when viewed along the optical axis, the magnetic isolation element and the driving magnetic element at least partially overlap; and
   the fixed part includes a housing, and the magnetic isolation element is disposed between the housing and the driving magnetic element.

3. The driving mechanism for an optical element as claimed in claim 2, wherein the driving magnetic element is at least partially located between the magnetic isolation element and the first elastic element;
   when viewed along the optical axis, a corner of the first elastic element is exposed to the magnetic isolation element; and
   the corner of the first elastic element exposed by the magnetic isolation element is connected to the housing.

4. The driving mechanism for an optical element as claimed in claim 3, wherein the housing has a concave portion corresponding to the exposed corner of the first elastic element;
   the concave portion is recessed toward the first elastic element;
   the fixed part includes a protruding column portion, and the first elastic element is connected to the protruding column portion;
   when viewed in a direction that is perpendicular to the optical axis, the concave portion at least partially overlaps the magnetic isolation element; and
   when viewed along the optical axis, the concave portion at least partially overlaps the first elastic element and the protruding column portion.

5. The driving mechanism for an optical element as claimed in claim 3, wherein the fixed part further includes a base, and the housing corresponds to the base;
   the first elastic element is connected to the base;
   the base has a protruding column portion, and the first elastic element is connected to the protruding column portion;
   the holder is between the first elastic element and the second elastic element;
   the second elastic element is used for electrical conduction; and
   the base further has a circuit member, and the second elastic element is electrically connected to the circuit member.

6. The driving mechanism for an optical element as claimed in claim 3, wherein the magnetic isolation element has an inner notch, and a limit portion of the movable part is exposed to the inner notch;
   the magnetic isolation element further has a dodge portion, wherein in a direction along the optical axis, the first elastic element is exposed to the dodge portion, and when viewed along the optical axis, the first elastic element protrudes from the dodge portion;
   when viewed in a direction that is perpendicular to the optical axis, the magnetic isolation element completely covers the driving magnetic element;
   when viewed along the optical axis, the shortest distance between the inner notch and the optical axis is less than the shortest distance between the dodge portion and the optical axis; and
   when the movable part moves to a limit position, the limit part contacts the housing.

7. The driving mechanism for an optical element as claimed in claim 3, further comprising a winding post arranged in the movable part for a lead wire of the driving coil to wind;
   when viewed from a light incident direction of the driving mechanism for an optical element, the winding post is at least partially shielded by the movable part.

8. The driving mechanism for an optical element as claimed in claim 2, wherein when viewed along a direction that is perpendicular to the optical axis, the magnetic isolation element has a C-shaped structure;
   the magnetic isolation element includes an upper partition and two side partitions, and the two side partitions are connected by the upper partition;
   when viewed in a direction that is perpendicular to the optical axis, the two side partitions are located between the housing and the driving magnetic element;
   in the direction of the optical axis, the upper partition is located between the driving magnetic element and the housing;
   the maximum width of each side partition in the direction of the optical axis is greater than the maximum width of the driving magnetic element along the optical axis;
   when viewed in a direction that is perpendicular to the optical axis, the two side partitions at least partially overlap the driving coil; and
   when viewed in a direction that is perpendicular to the optical axis, the two side partitions expose at least a portion of the driving coil.

9. The driving mechanism for an optical element as claimed in claim 2,
   wherein the extension structure has an inclined surface inclined with respect to the optical axis.

10. The driving mechanism for an optical element as claimed in claim 1, further comprising a limit structure for limiting the movement of the movable part along a direction that is perpendicular to the optical axis;
   the limit structure is located between a plurality of columns of the protruding column portion of the fixed part;
   the movable part has a groove, located at a side of the movable part which is not parallel to the side of the movable part where the driving magnetic element is disposed;
   the limit structure is accommodated in the groove; and
   when viewed along the optical axis, the thickness of the limit structure in a direction perpendicular to the optical axis is greater than the thickness of the groove in a direction perpendicular to the optical axis.

\* \* \* \* \*